United States Patent [19]

Theriot et al.

[11] 3,963,050

[45] *June 15, 1976

[54] PNEUMATIC RELAY

[75] Inventors: Gerald F. Theriot; Frank M. Hoofnagle, both of Houma, La.

[73] Assignee: B.W.B. Controls, Inc., Houma, La.

[ * ] Notice: The portion of the term of this patent subsequent to Apr. 15, 1992, has been disclaimed.

[22] Filed: Apr. 14, 1975

[21] Appl. No.: 567,927

Related U.S. Application Data

[63] Continuation of Ser. No. 394,849, Sept. 6, 1973, Pat. No. 3,877,484.

[52] U.S. Cl. ............................. 137/625.66; 137/458
[51] Int. Cl.² .................. F15B 20/00; F16K 17/00
[58] Field of Search ........... 137/458, 464, 465, 466, 137/625.66

[56] References Cited
UNITED STATES PATENTS

| | | | |
|---|---|---|---|
| 3,044,492 | 7/1962 | Peters et al. | 137/625.66 |
| 3,621,881 | 11/1971 | Vicari | 137/458 X |
| 3,706,325 | 12/1972 | Pauliukonis | 137/625.66 |
| 3,746,047 | 7/1973 | Peters | 137/458 X |
| 3,823,739 | 7/1974 | McMullan | 137/624.27 |
| 3,877,484 | 4/1975 | Theriot et al. | 137/458 X |

*Primary Examiner*—Alan Cohan
*Assistant Examiner*—Gerald A. Michalsky
*Attorney, Agent, or Firm*—Robert W. B. Dickerson

[57] ABSTRACT

A fluid valve operative based on a pressure differential through the utilization of different size pressure receiving piston faces. A first fluid, through pressure on an enlarged piston face, maintains a valve spool so shifted as to allow for a through passage of a second fluid. Upon a blocking of the first fluid, the second fluid, acting on a relatively smaller valve surface, actuates the valve and blocks through passage of the second fluid. The shifting of the valve presents yet a smaller pressure receiving face to the first fluid which, in conjunction with an exhaust port, provides a fail safe lock out requiring manual resetting of the relay.

1 Claim, 3 Drawing Figures

U.S. Patent   June 15, 1976   3,963,050
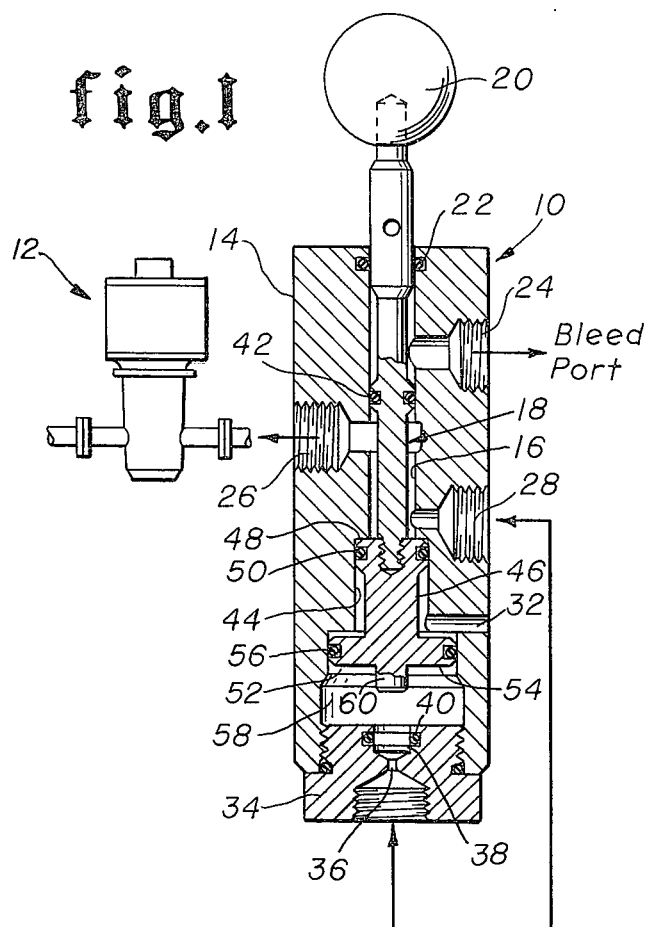
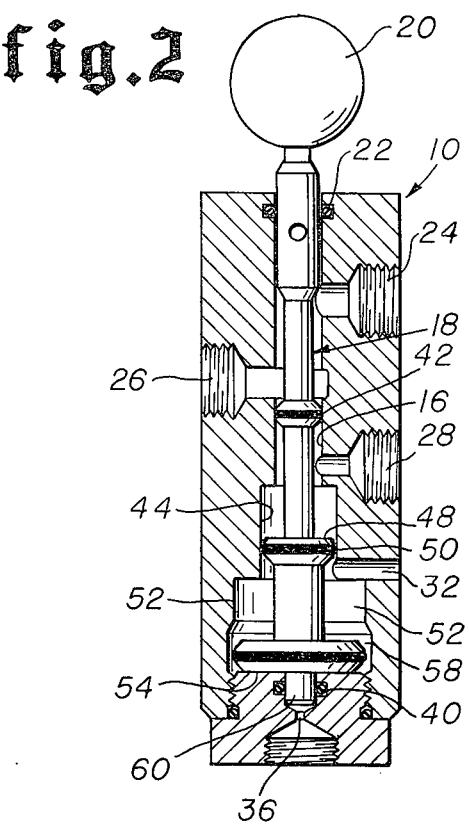
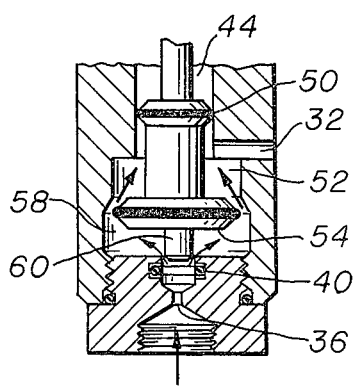

PNEUMATIC RELAY

This is a continuation application of Ser. No. 394849 filed Sept. 6, 1973, now U.S. Pat. No. 3,877,484.

The present invention is generally concerned with pneumatic relays or fluid valves of the type utilized in conjunction with an automatic actuator for a gas or oil well line to cause the actuator to shut the well in should the pneumatic supply be blocked for any reason.

In conjunction with the above, the relay or valve incorporates a pressure controlled lock out which is fail safe in operation, particularly when compared to the more conventional spring-operated pin lock out devices which operate erratically and frequently fail under actual operating conditions.

Basically, the relay or valve of the invention is installed upstream of an actuator and includes an elongated valve member longitudinally shiftable within a valve body basically between a first postion allowing through passage of actuator fluid from a supply to the actuator, and a second position closing off the actuator supply and bleeding the actuator itself. Movement of the valve member is controlled basically by the presence or absence of a control fluid pressure in conjunction with different pressure receiving areas on the selectively exposed valve member or piston faces.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a vertical cross-sectional view through the relay of the invention positioned with a schematically illustrated system;

FIG. 2 is a similar cross-sectional view of the relay with the valve member shifted to a flow terminating position; and FIG. 3 is a partial sectional view illustrating the safety lock-out concept of the invention.

Referring now more specifically to the drawings, reference numeral 10 is used to generally designate the relay or valve comprising the invention. As will be appreciated from FIG. 1, the relay, in the contemplated environment, will be positioned on the upstream side of an automatic actuator 12 utilized to shut in a gas or oil well should the pneumatic supply be blocked for any reason.

The relay 10 itself includes an elongated body 14 having a central bore 16 therethrough which slidably receives the valve member 18.

The valve member 18 projects beyond one end of the body 14 and is provided with a manipulating head or handle 20 thereon, an appropriate sealing ring 22 precluding the escape of fluid from the bore 16 at this first end of the body 14.

A fluid bleed port 24 is provided in communication with the bore 16 inward of the first end of the body 14. An outlet port 26, which communicates with the actuator 12, is provided inward of the bleed port 24 and also communicates with the central bore 16. An actuator fluid inlet port 28 is provided inward of the outlet port 26 and communicates the actuator fluid supply 30 with the relay 10. Finally, an exhaust port 32 is provided inward of the inlet port 28. The second end of the body 14 is closed by a plug 34 which has a small control fluid inlet port 36 therein communicating with a relatively small cylindrical valve seat 38 incorporating an O-ring seal 40.

The valve member 18 is provided with a first bore wall engaging O-ring seal 42 peripherally thereabout at a point selectively shiftable from between the bleed port 24 and outlet port 26, so as to allow for a through passage of the actuator fluid from the inlet 28 to the outlet 26 and actuator 12, and a second inwardly shifted position between the inlet 28 and the outlet 26 precluding flow therebetween while opening communication between the outlet 26 and bleed port 24 for a bleeding of the fluid from the actuator 12.

Immediately below or inward of the inlet port 28, the bore 16 is cylindrically enlarged, as indicated by reference numeral 44, the exhaust port 32 communicating with this enlarged bore portion 44 at the end thereof remote from the inlet port 28.

That portion of the valve member 18 within the enlarged bore portion 44, is also cylindrically enlarged as indicated by reference numeral 46, presenting an enlarged piston or pressure receiving face 48 directed toward the intake port 28 with an appropriate bore wall engaging O-ring seal 50 provided peripherally thereabout inward of the piston face 48.

The bore 16, below the exhaust port 32, or toward the second end of the valve body 14, is again cylindrically outwardly enlarged, as indicated by reference numeral 52. The valve member 18 is similarly enlarged, presenting a substantially greater piston face or pressure receiving face 54 directed toward the second end of the valve body 14 and the control fluid inlet 36. This further enlarged or piston portion of the valve member 18 also carries a peripheral sealing ring 56 which engages the wall of the bore portion 52. The bore 16 terminates, immediately inward of the valve seat 38, in a further slightly enlarged portion 58 into which the last mentioned enlarged piston portion of the valve member 18 moves, breaking the sealed engagement of the sealing ring 56 with the bore wall as will be readily appreciated from FIGS. 2 and 3. The extreme end of the valve member 18 is provided with a greatly reduced cylindrical end portion 60 which seats within the end valve seat 38 into sealing engagement with the sealing ring 40 provided therein.

It is contemplated that the actuator fluid be supplied at a pressure of 90 pounds while the control fluid be supplied at a pressure of approximately 30 pounds. In operation, assuming the manually set position of FIG. 1, the pressure of the control fluid on the enlarged piston or pressure receiving face 54 is sufficient so as to retain the valve member 18 in its extended position as illustrated in FIG. 1, providing a through passage for the actuator fluid from the supply to the actuator, the piston face 48 seating against the shoulder defined between the main bore portion and the first enlarged bore portion 44. With the pressure receiving face 48 seated against the bore defined shoulder, it will be appreciated that the surface presented to the greater actuator fluid pressure is substantially reduced with the difference between the area of this face and the area of the face 54 receiving the control fluid pressure being specifically sized so as to result in a greater axial pressure on the face 54 and retention of the valve member 18 in the position of FIG. 1. It will be noted that in this position, the seal 42 closes off the bleed port 24 from both the inlet and outlet ports.

Should the control fluid be blocked, or the pressure thereof substantially reduced for any reason, the pressure on the face 54 is immediately decreased and the now greater pressure on the face 48 moves the valve member 18 inwardly, seating the reduced area end valve portion 60 within the valve seat 38 and at the same time closing communication between the inlet port 28 and the outlet port 26 so as to bleed the actuator pressure out of the relay 10, and, through the automatic operation of the actuator, cause the gas or oil well to shut in.

Once the relay has closed, it is essential that it not reopen until the malfunction which caused the initial closing be corrected. In other words, it is extremely important that the relay remain closed until specifically reset, regardless of reinstitution of the initally controlling pressures. In effecting this, it will be noted that with the valve portion 60 seated within the valve seat 38 over the small inlet port 36, only an extremely small pressure receiving surface is presented even should the original control fluid pressure return, this surface being substantially less than the surface 48 now fully presented to the substantially greater actuator fluid pressure as will be readily appreciated from FIG. 2, thereby avoiding substantially any possibility of the valve member 18 shifting to its activated position of FIG. 1.

As yet a further safeguard, and in order to make the relay fail safe in operation, provision is also made for a situation wherein the actuator fluid pressure is lost in conjunction with a restoration of the control fluid pressure, or if some slight leakage around seal 40 occurs. Such an unusual circumstance would normally result in a return of the valve member 18. However, the reduced size of the control fluid inlet port 36, in conjunction with the enlarged exhaust port 32 and the fluid passing space about the largest lower valve member portion provided by the enlarged bore portion 58 provides for a direct exhausting of any entering control fluid subsequent to a movement of the valve member 18 sufficiently so as to break the seal between the valve member portion 60 and the seal 40 within its seat 38. The relative sizes of the exhaust port 32, inlet port 36 and fluid path suggested by the arrows in FIG. 3 is obviously to be such as to provide for a complete exhausting of any fluid pressure which might be produced in a situation as just described whereby a further closing movement of the valve member 18 is specifically precluded. In this manner, a positive lock-out is provided without requiring any mechanical latches, springs, lockpins or the like with the lock-out being substantially fail safe in operation.

From the foregoing, it should be appreciated that a highly unique pneumatic relay or fluid valve has been defined. This valve incorporates a lock-out feature which accommodates any foreseeable circumstance effectively and simply without in anyway affecting the manual resetting of the relay.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling with the scope of the invention.

I claim:

1. A valve comprising a valve body, an elongated bore within said body, a first fluid inlet port, an outlet port, a bleed port, second fluid inlet port, valve member slidable within said bore, means for positioning said valve member in a first position whereby communication is permitted between said first inlet port and said outlet port but communication is precluded between said bleed port and said outlet port, means for positioning said valve member in a second position whereby communication is permitted between said bleed port and said outlet port but is precluded between said first inlet port and said outlet port, and means for preventing pressure exerted against said valve member through said second inlet port from moving said valve member from said second position to said first position, wherein said preventing means includes first and second enlarged portions of said bore intermediate said second fluid inlet port and said first fluid inlet port, one of said enlarged portions sealingly accommodating said valve member and the other of said enlarged portions being of such greater diameter than said valve member as to not sealingly accommodate said valve member.

* * * * *